United States Patent

[11] 3,631,252

| [72] | Inventor | Radames K. H. Gebel |
| | | Dayton, Ohio |
| [21] | Appl. No. | 22,301 |
| [22] | Filed | Mar. 24, 1970 |
| [45] | Patented | Dec. 28, 1971 |
| [73] | Assignee | The United States of America as represented by the Secretary of the Air Force |

[54] IMAGE CONTROL APPARATUS UTILIZING THE CONVOLUTION OF PHOSPHORS
3 Claims, 27 Drawing Figs.

[52] U.S. Cl.................................................. 250/213 VT, 250/83.3 HP, 250/229, 315/10
[51] Int. Cl........................................................H01j 31/50, H01j 39/12
[50] Field of Search........................................... 250/207, 213 VT, 227, 229, 237, 71.5 R, 83.3 HP; 315/10, 11, 12

[56] References Cited
UNITED STATES PATENTS
| 3,273,458 | 9/1966 | Kohler | 250/227 X |
| 3,497,699 | 2/1970 | Pietri et al. | 250/213 VT |
| 3,435,275 | 3/1969 | Bauman | 315/12 |
| 3,151,268 | 9/1964 | Clark et al. | 315/10 |
| 3,419,745 | 12/1968 | Wenzel | 315/10 |
| 3,515,882 | 6/1970 | Hess | 250/213 VT |

Primary Examiner—Anthony L. Birch
Attorneys—Harry A. Herbert, Jr. and Robert Kern Duncan ABSTRACT: By using the delay time incurred in image reproduction brought about by the convolution action of the phosphor in image converter tubes, time is obtained in which to turn off the reproduction of the image or to lower the reproduction intensity so that the intensity of the oncoming image will not damage a camera tube or overexpose photographic film. Conversely, time may be achieved in which to turn the image on, likewise to a camera tube or photographic film, or reproducing or recording a fast-acting phenomenon such as a lightning flash or bomb burst without the necessity of wasteful continuous exposure in order to "catch" the desired image.

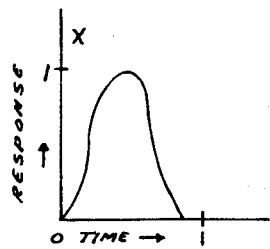
Fig-1
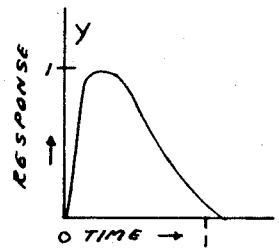
Fig-2
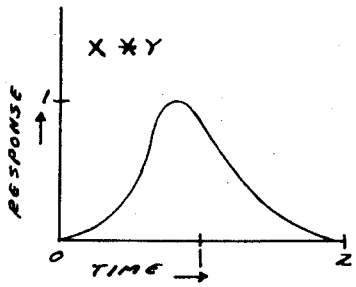
Fig-3
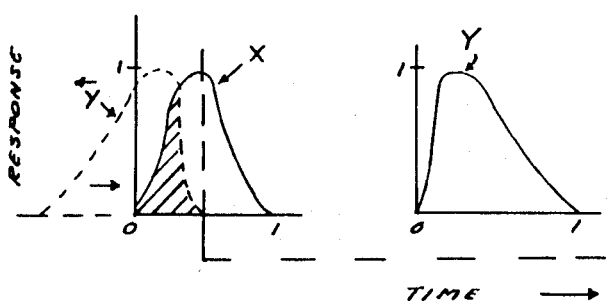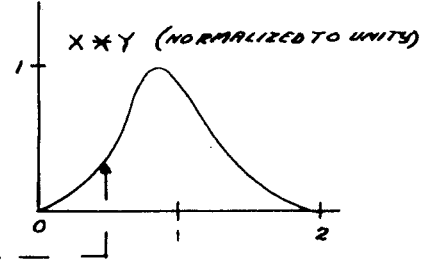
Fig-4

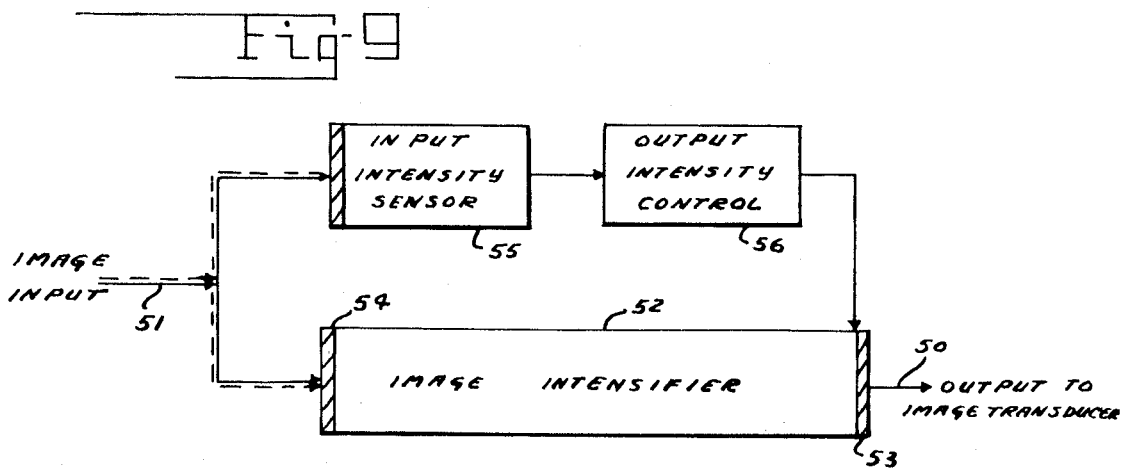
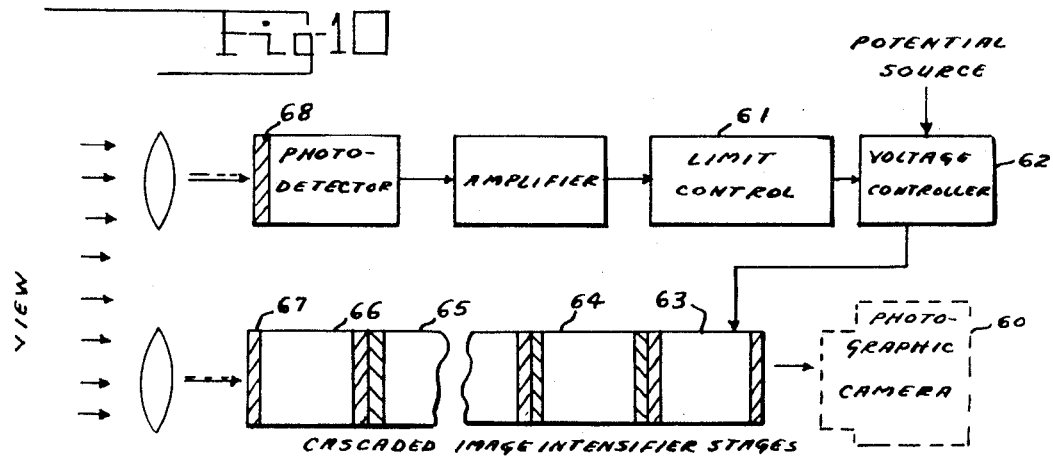
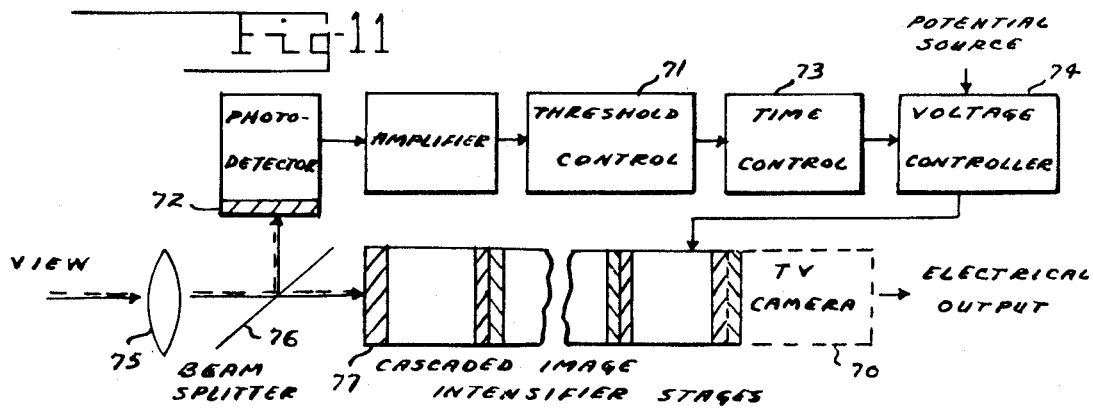

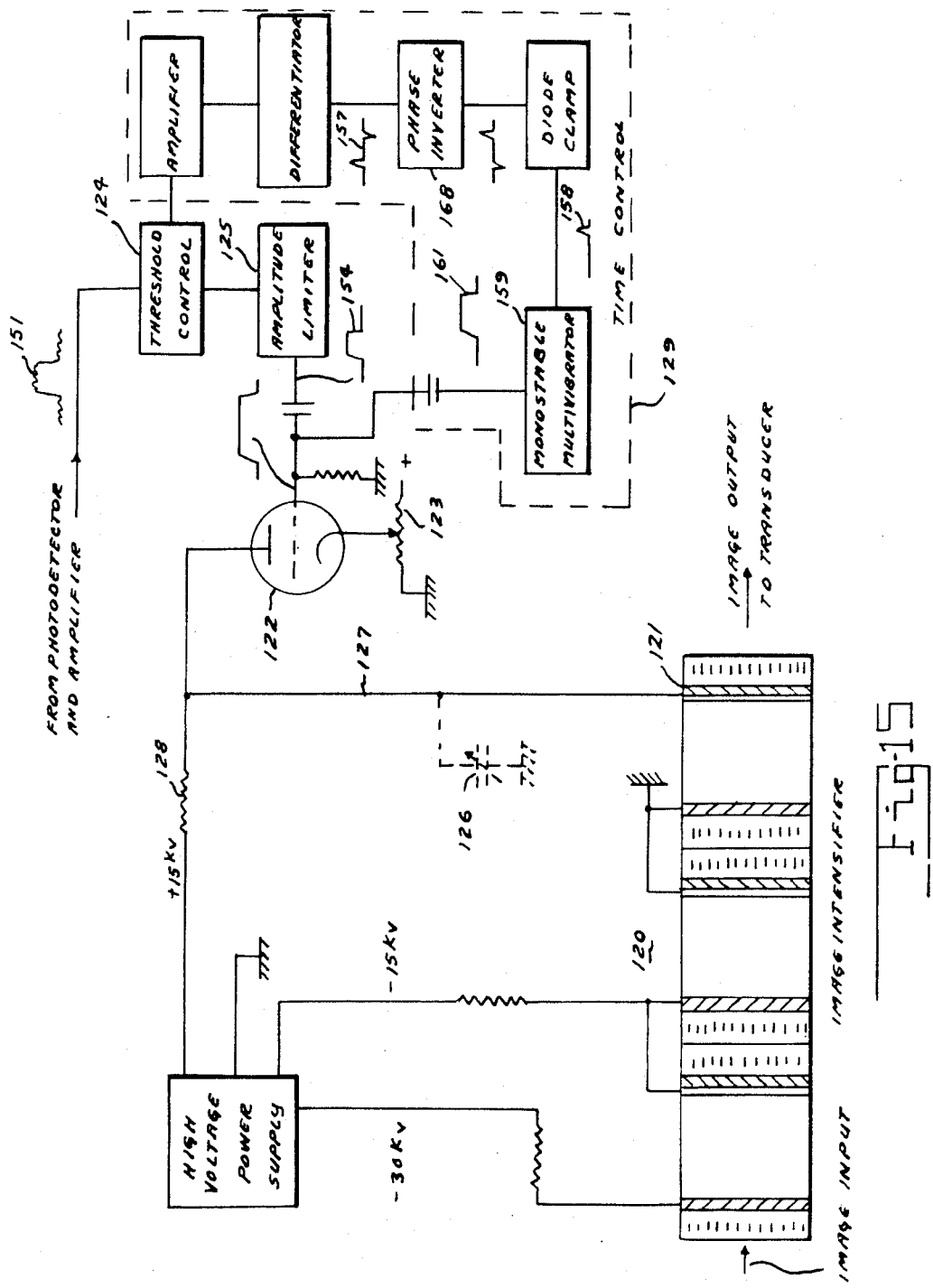

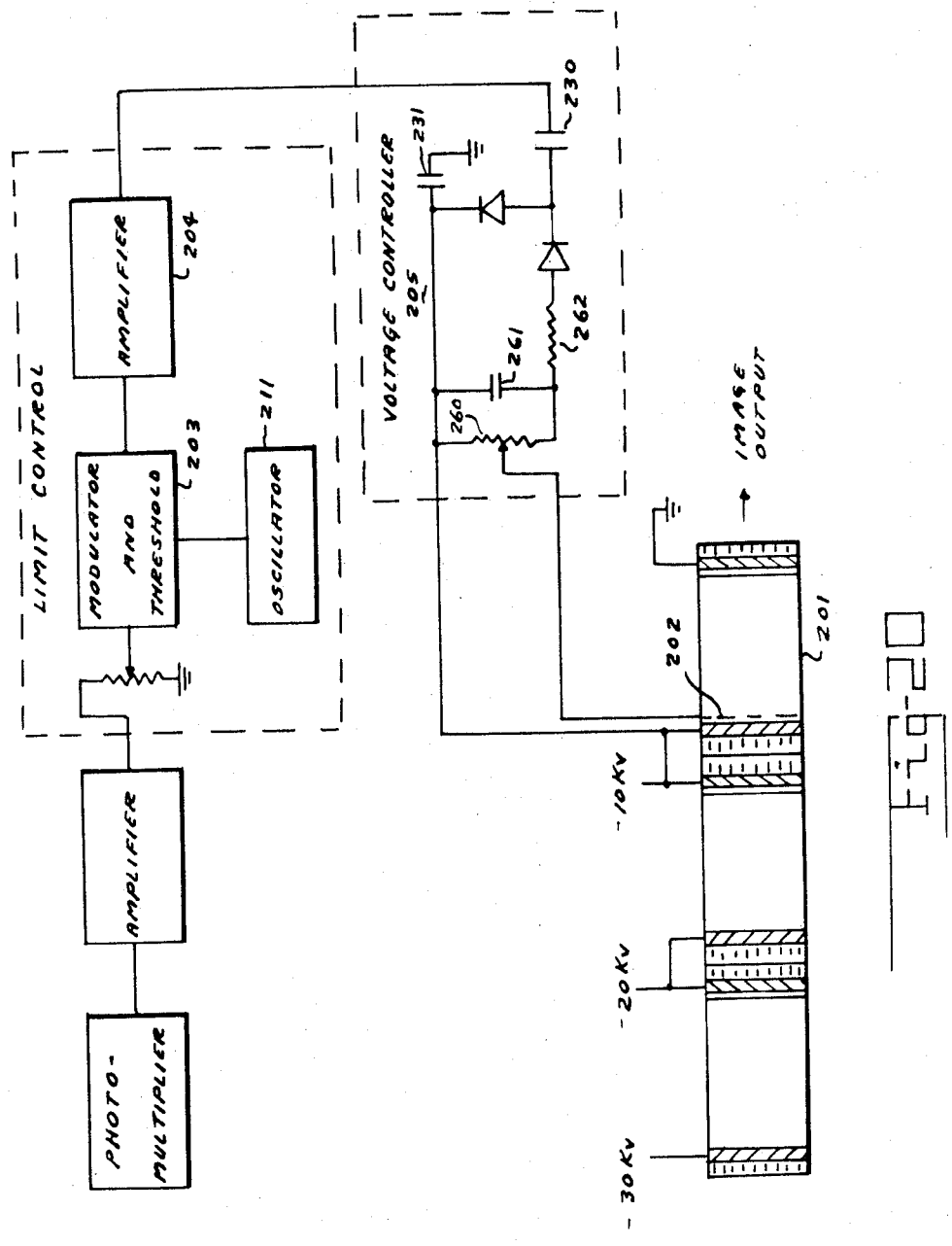

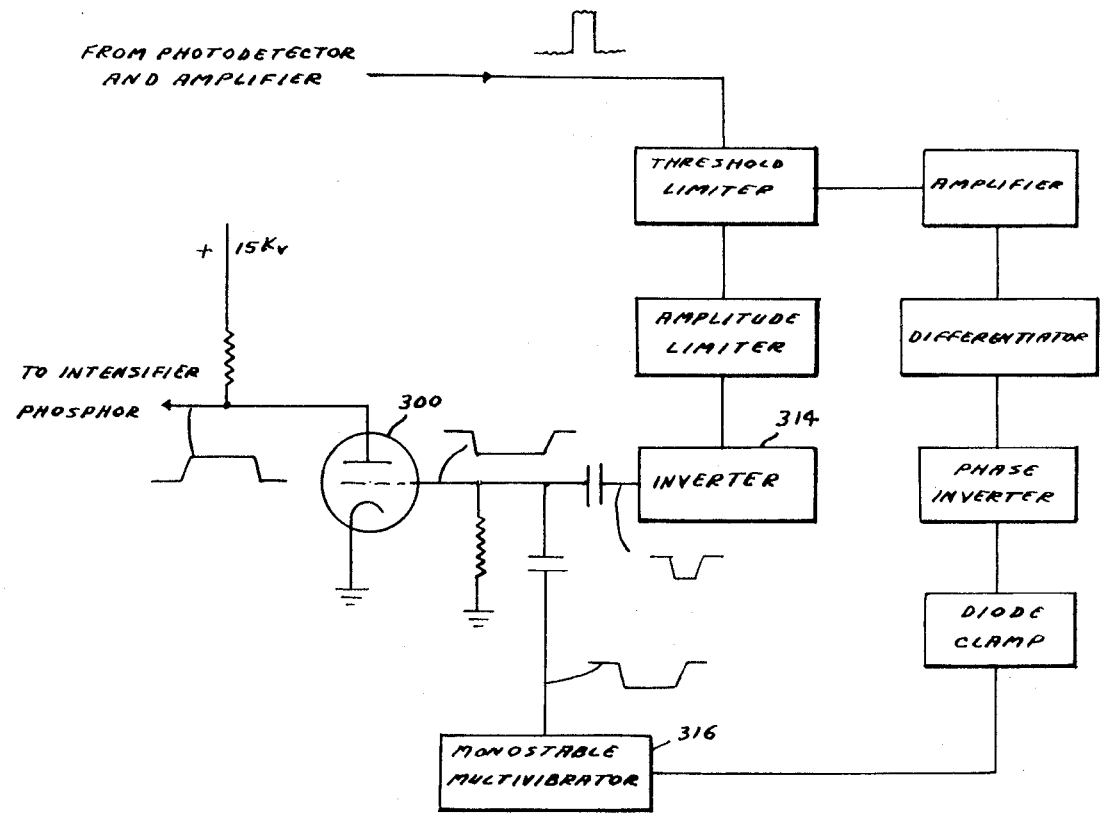
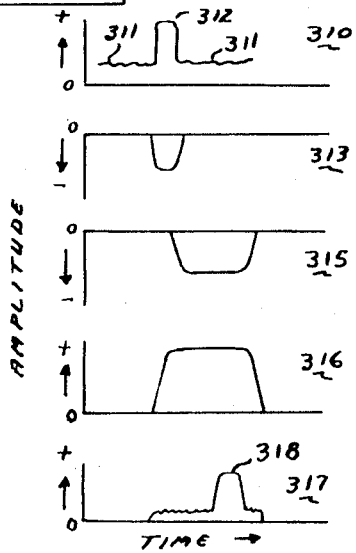

IMAGE CONTROL APPARATUS UTILIZING THE CONVOLUTION OF PHOSPHORS

BACKGROUND OF THE INVENTION

The field of the invention is in the art of electronic control of image reproduction in accord with image intensity.

The oldest and most well-known means of controlling the amount of light entering a camera tube or falling on a photographic plate are mechanical shutters and iris aperture controls. These may either be manually adjusted or controlled by a photocell "electric eye" as in the conventional automatic cameras that are widely used. Electrically activated chemical shutters such as the Kerr cell are also well-known light control devices. The advent of television and extremely fast photographic film have brought forth the need of fast-acting automatic light intensity control devices. Television camera tubes are delicate, very expensive, and can be easily damaged by overexposure to light of too great an intensity. Recently issued U.S. Pats. to D. Wenzel (No. 3,419,745) and R. M. Bauman (No. 3,435,275) exemplify the current state of the art. While these and other former devices adequately take care of relatively slow changes in intensity, none have fast enough response time to adequately protect image transducer tubes or photographic film from overexposure and damage due to lightning flashes, bomb bursts, electric discharges, flashbulbs, gunfire, and similar high-intensity rapid rise time flashes. In these prior art devices, the high-intensity illumination has already fallen on the delicate photocathode and may damage it before the protective device can respond to the sudden change in illumination.

SUMMARY OF THE INVENTION

The convolution of the phosphor response of an image intensifier is employed as a light time delay for gaining the time needed to operate a threshold controllable gating system designed to prevent randomly occurring high-intensity flashes from reaching and overexposing and damaging costly and highly fragile television cameras, photographic film, or related light sensitive devices. The gating off of the image to the image transducer thus also prohibits any high-intensity flashes from being present in the reproduced image and will thus prevent kinescope recordings from being accidentally overexposed by these flashes. For flashes of short duration, the blanking in the reproduced image will not be visually noticeable to an observer watching the reproduced image. In the case of the necessity of a longer blanking duration, brought about by high-intensity light of longer duration, the blank or dead spot in the reproduced image is much less annoying to an observer than the complete blanking on the face of the reproduction tube brought about by the bright flash. In an alternative arrangement the last undisturbed image frame may be substituted for the blanked out frames utilizing a conventional storage device. This eliminates to the observer the picture going dead, during blanking time. In instances where it is desirable to observe high-intensity localized flashes, the intensity level of the image presented to the image transducer tube by the image converter may be reduced in intensity from the normal level to a safe level that will protect the equipment yet permit a reproduction picture of the flash. In this case, the normal picture background is faded out in proportion to the intensity of the flash. After the flash is over the picture is automatically brought back up to its normal level. This greatly enables an observer to locate the position of the flash, such as a bomb burst, in the scene being viewed.

In another mode of operation of kind invention, only images that have an intensity level above a defined threshold value are presented to the image transducer. This mode of operation is particularly valuable in photographically locating infrequent and randomly occurring (in time) electrical arc-overs and similar flashes.

BRIEF DESCRIPTION OF THE DRAWINGS

FIGS. 1, 2, 3, and 4 show the development of the convolution response characteristic;

FIG. 9 is a block diagram of the invention;

FIG. 10 is a block diagram of an embodiment of the invention for limiting the image output to a maximum value of intensity;

FIG. 11 is a block diagram of an embodiment of the invention for blanking the image output while the image exceeds a determined threshold value or for reproducing an image during the time the image exceeds a determined threshold value;

FIG. 15 is a more detailed partial block-schematic diagram for blanking the output of the intensifier by voltage control of the last image reproducing phosphor of the image intensifier;

FIG. 20 is a block-schematic diagram of an embodiment of the invention wherein the image output is held to a determined maximum value of intensity through control of an image gate control electrode in an image intensifier;

FIG. 25 is a partial block-schematic diagram of an embodiment of the invention showing a circuit for providing an image only for scene intensities exceeding a determined threshold; and FIG. 26 shows in graphical form typical waveforms of the circuit shown in FIG. 25.

DESCRIPTION OF THE PREFERRED EMBODIMENT

To properly understand the operation of this invention an understanding of the concepts of convolution must first be achieved. Very briefly, and in a simplified normalized form, the convolution response of cascaded unit X, having the response shown in FIG. 1, with unit Y having the response shown in FIG. 2, is that shown in FIG. 3. The plot of FIG. 3 is graphically obtained by reversing the plot on transparent paper of either FIG. 1 or FIG. 2 (in this case FIG. 2 was used) and sliding it along over FIG. 1 and plotting the total combined (integrated) area under the two curves as FIG. 3. FIG. 4 shows a representative step in the process. For additional information on convolution, reference is made to chapter 3 of the textbook "The Fourier Transform and Its Applications" by Ron Bracewell, published by the McGraw-Hill Book Company.

I have found that the light emitting characteristics of phosphors from electron beam excitation is that of convolution response, and that this type response applies generally to a single phosphor screen individually, and to the combined response of cascaded stages of reproducing phosphors.

Beginning with the simplified consideration that a phosphor is brought into an excited state at time $t_o$ by a $\delta$ pulse (an extremely short pulse with a time duration too short to be measured precisely), that the pulse consists of a number of electrons A, that the conversion factor to excited states from electrons is $\eta$, and that the phosphor under consideration emits only in a fairly narrow wavelength band, that no trapping mechanism or reabsorption again of the energy liberated by the deexcitation occurs; then the number of excited states, B, as yielded by the $\delta$ pulse, is given by:

$$B = A \cdot \eta$$

Figure 5:
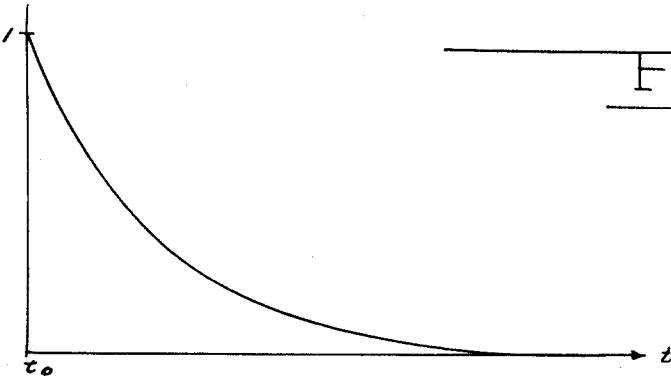
FIG. 5 is a plot of the excited states in a phosphor from a very short excitation pulse of electrons.

The well-known equation for expressing the number C of remaining excited states after time $t$ is:

$$C(t) = B \cdot e^{-t}$$

where $\alpha$ is the recombination efficiency (and for the present, in this simplified case it may be considered that it is a constant). This number of excited states is represented by the exponential curve of FIG. 5, normalized to unity, i.e., $B=1$. The peak of excited states occurs at $t_o$, the same time as the $\delta$ pulse, and the number of excited states decreases according to the exponential function as time progresses.

After these excited states have been reached in the phosphor material, and the excitation energy source has passed, the excited system elevated to a high energy by the excitation energy, can no longer remain at this raised energy level and must return (fall back) to the deexcited (ground level) state. In returning to the normal deexcited state, energy is released as light. The returning of the carriers to ground level, as a function of time is also an exponential characteristic and the number of deexcited carriers D is expressed by $$D = \alpha \cdot B e^{-t}$$

Figure 6:
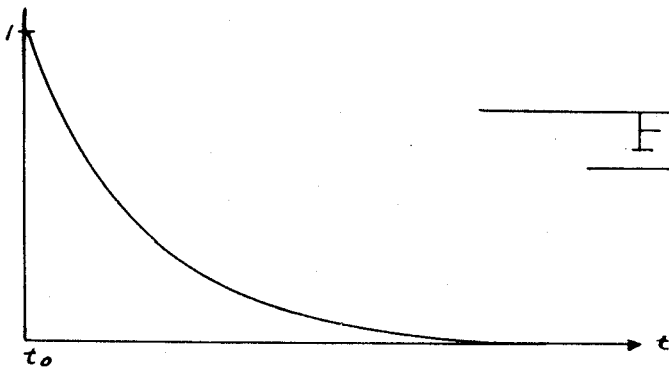
FIG. 6 is a plot of the deexcitation characteristic of a phosphor.

This is expressed represented as the plot shown in FIG. 6, normalized to unity, i.e., $\alpha \cdot B = basic\ 1$. Thus, the light output from a phosphor, in this restricted case, resulting from the foregoing $\delta$ pulse would be highest at the time of the $\delta$ pulse and reduces exponentially over a period of time in accord with the deexcitation curve of FIG. 6.

Figure 7:
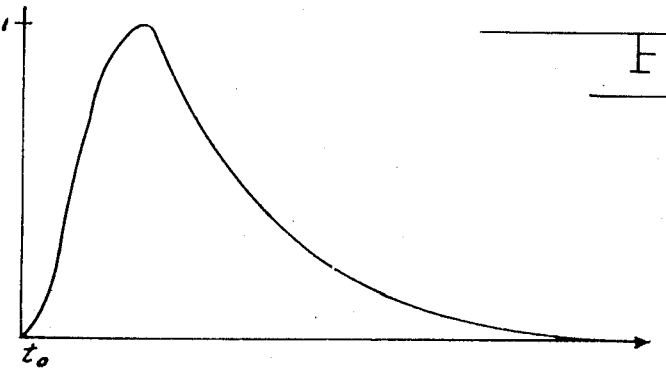
FIG. 7 is a plot of the light emitted by a phosphor from a very short duration excitation pulse.

Continuing to apply the foregoing enumerated restrictions, when two stages of image intensification are used either in a single tube, or when two single stage tubes are cascaded, each stage having an individual light output to a short pulse as shown in FIG. 6, the resultant light output H, as a function of time invention, t, from the second of the cascaded stages is a convolution of two responses and is mathematically expressed by:

$$H(t) = \beta(t) * \gamma(t) = \int_{-\infty}^{\infty} \beta(\tau) \gamma(t-\tau) d\tau$$

where $\beta(t)$ is the impulse response of one image intensifier stage and $\gamma(t)$ is that of the other, and $\tau$ is the dummy variable employed for the integration. This expression is the well-known convolution integral. The light output from these two stages, normalized to unity, is represented by the curve of FIG. 7 which is the convolution of two of the curves of FIG. 6. When a third similar stage is added the response of FIG. 7 is convoluted with the intrinsic $\delta$ pulse response of FIG. 6 again, and with each stage added the peak of the resulting output moves timewise more and away from the time of the original exciting pulse $\delta$, which occurred at $t_o$, and spreads out over more and more time duration.

In the foregoing discussion the limitations of the existence of no trapping mechanism or reabsorption again of the liberated energy occurring during the deexcitation, and that the recombination efficiency factor $\alpha$ was a constant, was assumed. In practice, using physical components, the factor $\alpha$ is not a constant but also a function time, since trapping of the excited states can and does occur and the light emanating from a single phosphor screen during deexcitation is not instantaneously emitted but partially reabsorbed by the phosphor screen, and thus causes further excited states, which during their deexcitation causes the emission of light at another wavelength. Thus, the time dependency of the factor $\alpha$ results in a convolution process between the reabsorption and effective emission of the phosphor which also causes emission over a relatively broad wavelength region. The resultant effect from typical well-known broadband phosphors is that the light output from a single phosphor screen, when considering simultaneously the whole spectrum, to an excitation pulse $\delta$ is not that of FIG. 6 but essentially that of the convoluted response shown in FIG. 7.

Figure 8:
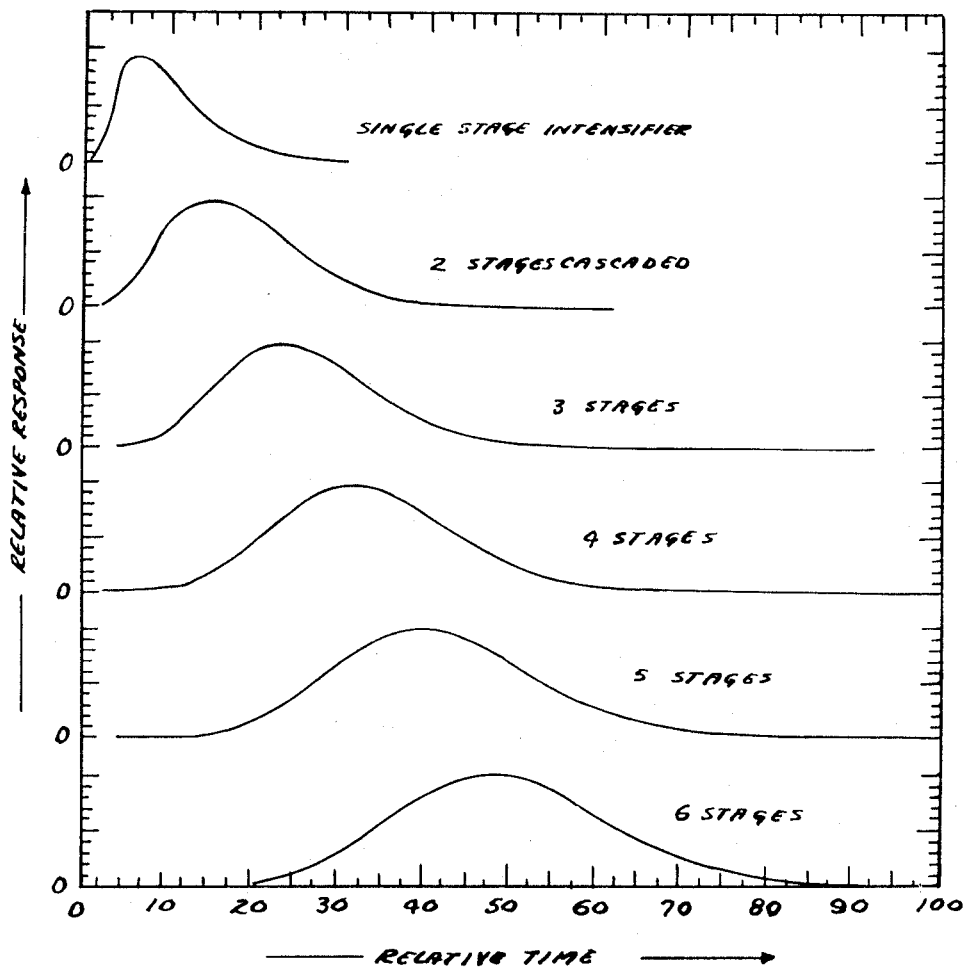
FIG. 8 shows in graphical form the response to a flash of cascaded image intensifier stages.

FIG. 8 shows typical response characteristics of image intensifiers having from one to six cascaded stages, each stage having a photocathode and phosphor. Each stage may obviously be separately contained in an individual image intensifier tube, and the intensifier tubes cascaded. The curves are normalized to unity amplitude. It is to be observed that with the first and each additional cascaded stage the light output peak is delayed more and more from $t_o$, the time of the excitation pulse, and that the duration of the reproduced light pulse is OR-gates over a greater interval of time.

FIG. 9 is a block diagram of an embodiment of the invention. The intensity of the light output at 50 of the intensifier 2 presented to the utilization transducer, which may be a television camera pickup, a photographic camera, a photographic film plate, the human eye, or other optical device, as a function of the optical input image 51 is controlled by the invention. As previously explained, the image output appearing on the phosphor of a conventional image intensifier tube is not simultaneous with the optical image falling on the photocathode of the tube, but delayed due to the convolution action that takes place in the reproducing phosphor. Thus, even if only a single stage is used in the image intensifier 52, a determined time delay will occur between reproducing the peak intensity of the flash on the output phosphor 53 and its occurrence on the input photocathode 54 as shown in the upper curve of FIG. 8. This delay in reproducing the peak in a single stage may provide sufficient time, with suitable fast response electronic control equipment, in which to prevent damaging intensities of light from reaching the transducer, however, as can be seen in FIG. 8, by using several cascaded stages even the onset of the reproduction of a flash is sufficiently delayed that control equipment may respond and prevent any of the flash from being reproduced at the transducer. By separately sensing the intensity of the light in the image 51 arriving at the photocathode 54 with a sensor 55 and through an electrical control system 56 that has a faster response control time than the reproduction delay time occurring in the image intensifier 52, the output from the phosphor 53 is turned ON, turned OFF, or maintained at a desired intensity level independent of fluctuations in the input image intensity.

I have found, in general, with conventionally available imaging components that three stages of image intensification using type P4 phosphors in the image intensifier 52, suitable time delay in the image reproduction on the output phosphor is obtained so that conventional components may be used in the electronic control system. Additional stages may be used to achieve a greater delay time but image resolution suffers in coupling two adjoining fiber optic surfaces; with fewer stages an excessive burden is placed on the response time of the electronic control equipment.

Image memory are well known. It has been found that intensifiers having the conventional P4 phosphor coupled with the conventional S20 photocathode provide suitable decay characteristics and give good overall efficiency. For general useage they are perferred, however, many other of the well-known phosphors and emitters may be used particularly when different spectral response is desired. In a simplified embodiment of the invention three separate conventional image intensifier tubes are cascaded to comprise the image intensifier 52. In some embodiments the three stages may be contained in one tube. Coupling of stages through conventional fiber optics is generally preferred. In a typical embodiment three conventional similar image intensifier tubes each having fiber optics at both the input photocathode and at 1801, output phosphor were cascaded to provide the intensifier 52.

Two distinct types of image intensifier tubes are commercially available. (Some manufacturers call them image converter tubes, generally the terms are synonymous.) The difference between the two types is that the more recently developed tubes such as the Aerojet Delft Type 8040 have an additional control electrode that is used to control the output intensity of the tube. This control electrode operates at a potential relatively close the photocathode potential. In this particular type 8040 tube, a positive voltage of approximately 370 volts, with respect to the photocathode, results in the design maximum image intensity and a negative voltage of approximately 370 to 1,600 volts (depending upon the angle of operation) will cut the tube off. The earlier tubes, without this additional control electrode, are suitable for use in this invention where an ON-OFF situation is desired. The last intensifier tube (or stage) in this instance is switched on or off by merely applying or removing the potential from the aluminized phosphor. It is not feasible to attempt to obtain varying amounts of intensity control with this type tube by varying the potential of the phosphor due to the changes in geometry of the reproduced image with phosphor (anode) potential. In the newer type of image intensifier tubes the intensity may be varied by controlling the potential of the control (gate) electrode without materially changing the geometry of the reproduced image. This type may be used in embodiments of this invention in which the intensity of the image output is maintained relatively constant with changing scene intensities.

Combined image intensifier and camera pickup tubes such as the Westinghouse type WX-31381 may also be used in this invention. A typical embodiment of the invention using a combined tube such as this has two additional cascaded stages of image intensification ahead of the combined tube.

The image input intensity sensor 55 is a conventional photodetector. Typical photodetectors suitable for use in this invention are the DuMont Multiplier Phototube Type 6292 and the RCA Type 4441 Photomultiplier Tube. Obviously, those practicing this invention will understand that the spectral response characteristics of the photodetector used should essentially contain the response spectrum of the image intensifier and that the spectral response of the intensifier must be compatible with the response of the transducer utilizing the image output therefrom.

The output from the photodetector is representative of the average light intensity over its sensitive surface. Thus, in some instances, it may be desirable to use a plurality of photodetectors each encompassing a relatively small portion of the total image so as to achieve greater sensitivity to a physically small high-intensity light. In this arrangement, whenever the average intensity in any one sensor exceeds a predetermined amount, the output intensity control circuit 56 is activated to control the output image intensity of the image intensifier.

In embodiments of the invention used to turn on the image intensifier 52 so that an image 50 is presented to an image transducer, such as a photographic film, to record a relatively high-intensity flash, the output intensity control applies the required potential to the image intensifier so that the output phosphor has the proper potential to reproduce the flash that has been received by the input photocathode 54, or in embodiments using an intensifier having a gate control electrode, the intensity control 56 raises the potential of the gate electrode from cutoff to the normal image reproduction value. After the flash has been passed to the transducer the intensity control returns the image intensifier to the off state. Likewise, in another embodiment of the invention, the intensity control 56 removes the voltage from either the output phosphor or the control electrode to blank out (inhibit) the reproduction of a flash that would overexpose or damage the image transducer optically coupled to the output of the image intensifier. These, along with still another embodiment in which the output intensity control 56 varies the potential of the control electrode in the image intensifier to provide an output image of an approximate maximum intensity will be further described in detail.

FIG. 10 shows a block diagram of an embodiment of the invention that limits the image output intensity to the image transducer 60, which may for example be a photographic camera or a television pickup tube, to a determined maximum value of intensity. The limit control 61 provides a control signal to the variable voltage controller 62 which varies the potential on the gate control electrode of the last stage 63 of the image intensifier, to essentially maintain the image output from the intensifier at a predetermined maximum value. In this embodiment at least the last stage of the intensifier must be the type of image intensifier stage having a gate control electrode for controlling the output image intensity. Earlier cascaded intensifier stages 64, 65, and 66 may be either of the two types previously discussed. The electronic circuits of this embodiment will be discussed later in detail. Shown in FIG. 10 are two separate lens systems for focusing essentially the same image, i.e., the same field of view on each the photocathode 67 of the first stage of the image intensifier and the photocathode 68 of the photodetector light sensor. A single lens with a beam splitter could be used as is shown in later embodiments.

In order to preserve sensitivity in the intensifier section, the beam splitter may be designed to give only a fraction of the light intensity to the photomultiplier that is given to the image intensifier. This is feasible since the photomultiplier section usually only has to respond to high light intensities and a lower input level will provide satisfactory operation. The ratio of intensities used is not critical as the electrical output of the photomultiplier is amplified and the electrical signal referred to an adjustable electrical threshold level equivalent to a corresponding light intensity level. The techniques and apparatus for imaging a view on electro-optical equipment are well known and not a part of this embodiment of the invention other than that the field of view of the image sensed for determining the value of light intensity is essentially the same as the image entering the intensifier.

FIG. 11 is a block diagram showing an embodiment of the invention for blanking the output of the intensifier to prohibit the reproduction of a bright flash at the input to the transducer 70, which may, as shown, be a television camera. (It is to be understood that the transducer is not a part of the embodiment and that any of the transducers previously enumerated may be used.) In this embodiment the threshold control 71 determines from the light intensity falling on the photocathode 72 of the photodetector when an intensity is present that would be damaging to the television pickup camera, or that would overexpose the film of a photographic camera and in conjunction with the time control circuit 73 activates the voltage controller 74 to essentially remove (switch off) the voltage from the phosphor in the one type of image intensifier stage, or to switch the control electrode in the other type intensifier stage to cutoff. (These types have been described previously.)

This same FIG. 11 also applies to embodiments for reproducing only light of intensities exceeding a predetermined threshold value. In these embodiments the threshold control 71, in conjunction with the time control 73, activates the voltage controller 74 to either apply the potential to the phosphor or, with the other type intensifier stage, to switch the control electrode from cutoff to the normal image reproducing voltage. It is to be understood that in embodiments of the invention for photographically recording a flash, such as lightning, electric arcs, bomb bursts, and similar events of relatively high light intensities that little intensification gain is needed and also that relatively low sensitivity film may be used which has better resolution, less fogging, and better storage characteristics. When using a conventional television camera pickup tube, a suitable conventional low light transmission filter may be used in front of the input photocathode and again the image intensifier may have a low gain to prevent overexposure or damage to the transducer. While not a part of these embodiments a single lens system 75 and beam splitter 76, as illustrated, may be used to provide essentially identical images of the same or a determined ratio of intensities to the input photocathode 77 of the image intensifier and the photocathode 72 of the photodetector.

It is imperative that the last cascaded image intensifier stage in either of the embodiments being described associated with FIG. 11 be either "ON" in the one case or "OFF" in the other at the time the image would be present at the last phosphor. The time delay between the time of the image falling on the input photocathode and its reproduction on the output phosphor due to convolution has been discussed. Without the time control circuit 73, which generates a time period equal to or slightly greater than the transit time of the image going through the image intensifier, a sufficiently high-speed electronic system would, in the case of very short duration light flashes, have turned the intensifier off and back on again prior to the images arriving at the output phosphor and thus the damaging image would be reproduced. (Or, in the embodiments operating in the converse mode for recording a flash, it would have turned on and back off and the flash would be missed.) Thus, it has been found desirable in most embodiments to preclude the necessity of attempting to match the electrical response time of the control system exactly to the image delay in the intensifier, but instead to use an electrical system having conventionally normally fast response time and add a time control circuit that provides a delay in switching the intensifier back to its former state that is slightly greater than the delay brought about by convolution in the intensifier. This greatly improves the reliability of operation and makes construction of these embodiments greatly simplified. The detailed circuitry of the block components will be given later.

Figure 12:
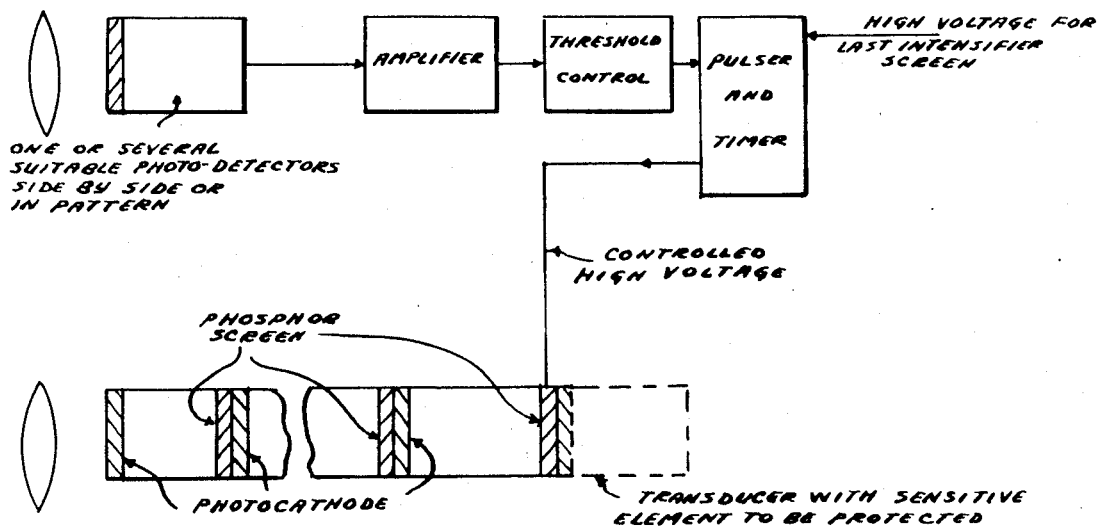
FIG. 12 is a block diagram of an embodiment of the invention as shown in FIG. 11 wherein the voltage to the screen (phosphor) of the last image intensifier stage controls the reproduction of an image.

FIG. 12 is a more detailed block diagram of a particular embodiment of the invention shown in FIG. 11. In this embodiment, the high voltage from the supply to the last phosphor screen is pulsed either from the on state to off state or from the off stage to the on state in accord with the particular usage of the invention, as previously explained. Cooperating with the pulser is a time control circuit functioning as priorly stated.

Figure 13:
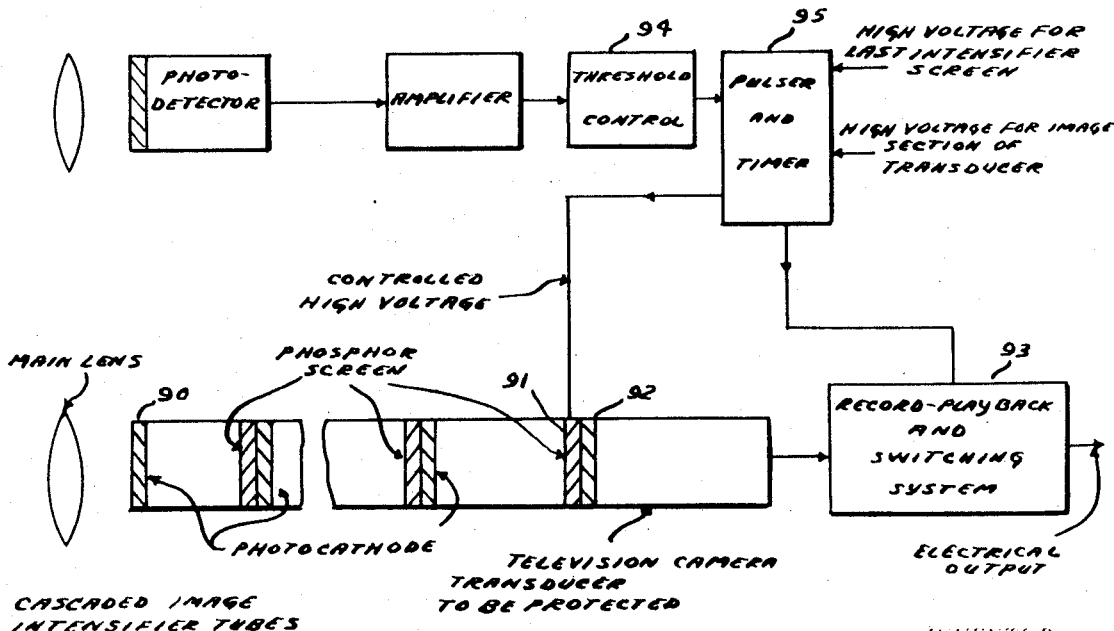
FIG. 13 is a block diagram of an embodiment of the invention that provides a repeat during blanking time of the last usable image frame.

As mentioned previously, the last usable frame may be "replayed" during the blank time that the OR-gate is removed, (to preclude the reproduction of a high-intensity flare), so that to an observer, such as a television audience, the appearance of the equipment going dead would not exist. FIG. 13 shows in block form a system that provides this operation. In normal operation the image on the photocathode 90 of the image intensifier is reproduced at the phosphor screen 91 of the image intensifier, and picked up by the sensitive input element 92 of the television camera. The output from the camera system is coupled through the conventional record and "instant" playback and switching system 93. These systems are well known particularly for their use in the immediate replaying of sporting events. Normally the received image is simultaneously being recorded as it is being directly transmitted as an electrical output. When a light of a destructive intensity, as determined by the setting of the threshold control 94, activates the pulser and timer 95 to blank out the reproduction of the image, the pulser also provides a pulse signal to the record and playback system causing it to switch from the recorder the last usable image frame to the electrical output for the duration that the received image is blanked out.

Figure 14:
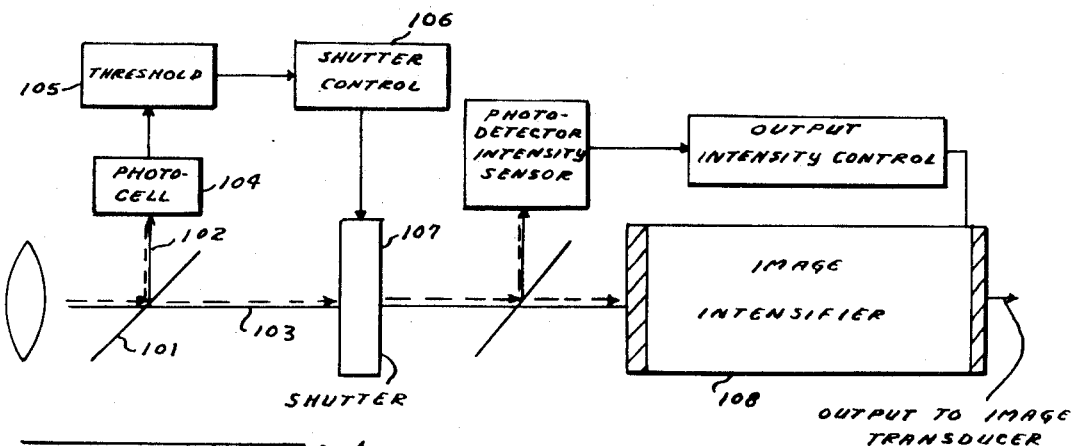
FIG. 14 is a block diagram of an embodiment of the invention providing protection to the image transducer from over exposure both during high-intensity short duration flashes and from long time exposures to high-intensity light.

While image intensifiers and photomultiplier photodetectors are much more rugged and much better able to withstand overexposure to high-intensity light than camera tubes and obviously photographic film, they will be damaged from prolonged exposure to intense light; such as when pointing directly at the sun on a "bright" day. Thus, when the embodiments of the invention previously described are inadvertently aimed at the sun and left in that position, the photodetector and the image intensifier will initially blank the image from the transducer as in normal operation to protect from a flash or flare. Then if the photodetector should fail (burn out) before the intensifier the transducer OR-gate be damaged by the intense light reproduced by the intensifier. Or, the first stage of the intensifier might fail first, in which case the transducer would be protected but the system would be impaired from operation. To preclude these possibilities of operator error from damaging the system, the embodiment shown in FIG. 14 is disclosed. In this embodiment the original image is split by beam splitter 101 into the two images 102 and 103. Image 102 is sensed by conventional photocell 104 which will withstand prolonged exposure to direct sunlight and other high-intensity light levels. When the output from the photocell 104 (high-intensity photocells are quite frequently referred to as solar cells) is sufficient to pass the threshold control 105 it activates the shutter control which closes shutter 107 prohibiting the continued passage of light to the remainder of the apparatus. The burst of light, that has passed before the shutter 107 activates, is prohibited from passing through the image intensifier 108 to the transducer as previously explained. The shutter 107 may be a conventional mechanical shutter operated by a relay type mechanism in the shutter control, or it may be a Kerr cell type shutter electrically controlled by the shutter control circuitry. Such light control shutters are well known and in extensive use. They are comparatively slow acting and by themselves are unable to protect a transducer from a flash of light. The remainder of the apparatus shown in the Figure gives that protection and the combination as shown provides complete protection to the transducer under all conditions. When the intense long duration light has ceased, or the system is pointed away from it, the output of the photocell drops, the shutter reopens, and images of safe intensity are passed to the transducer.

Figure 16:
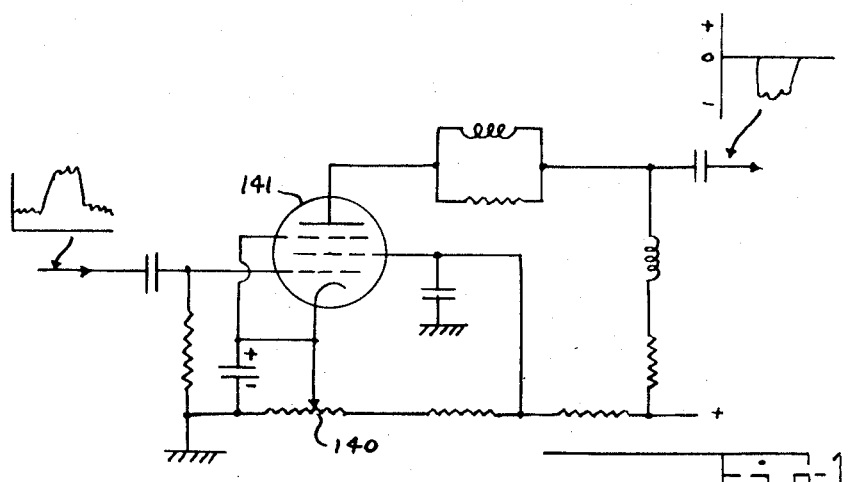
FIG. 16 is a schematic diagram of an example of a threshold limiter as shown in FIG. 15.
Figure 17:
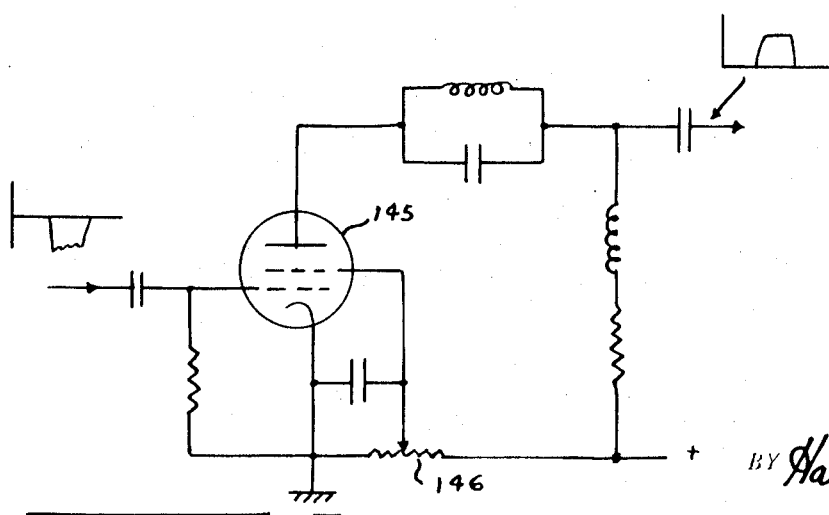
FIG. 17 is a schematic diagram of an example of an amplitude limiter as shown in FIG. 15.

FIG. 15 is a more detailed block-schematic diagram of the threshold control and pulser and time circuits 1115, FIG. 12. In this representative embodiment of structure for blanking the output of the three-stage image intensifier 120, the voltage on the output phosphor 121 is effectively removed prohibiting the reproduction of an image. In normal operation, the pulse tube 122 is operating at cutoff by the grid being at ground potential and the cathode being set at a sufficiently high enough positive potential on potentiometer 123 that no electron flow takes place. When light of such an intensity that would overexpose or damage the transducer receiving the image from the image intensifier occurs, an output from the threshold control occurs and the grid of pulse tube 122 is driven positive and the pulse tube conducts lowering the potential on the phosphor 121 to essentially ground potential. In the typical apparatus shown, the intensifier stages each operate at a 15 kilovolt potential between the photocathode and the phosphor. When the pulse tube 122 is placed in conduction, the voltage on the phosphor 121 drops to essentially ground potential. Generally one-sixtieth voltage less than 3 kv. is sufficient to extinguish the intensifier since all modern intensifiers use aluminized phosphors which require few kilovolts to overcome their threshold. A typical threshold control 124 is shown in detail in the schematic diagram shown in FIG. 16. The setting of potentiometer 140 determines the amount the pentode vacuum tube 141 is biased beyond cutoff which determines one-sixtieth second amplitude an input signal on the grid of the tube must have to provide an output signal. Thus, this voltage which is determinative of a corresponding level of light intensity is set to the maximum amount of image intensity that it is desired to pass to the transducer, which depends on the limitation of the particular transducer with which the invention is used. In practicing this invention, the limitations of the transducer are known thus it is a relatively simple procedure to calibrate the apparatus of this invention by adjusting potentiometer 140 such that light from the field of view that would cause an output of greater intensity than the capabilities of the transducer to be blanked out by the invention. In order to provide broadband and fast response operation of the threshold control circuitry, it has been found desirable to use conventional peaking circuits in the plate circuit of the tube. A similar threshold circuit may be used in those embodiments of the invention for controlling the admitting of light to the photodetector and intensifier shown as the threshold control 105 of FIG. 14, except that generally the peaking circuits would not be employed.

In order to prevent destructive grid current from flowing in the pulse tube 122 (FIG. 15) it is desirable to limit the amplitude of the pulse coming from the threshold control circuit. This is accomplished by the amplitude limiter 125. A representative limiter schematic circuit is shown in 17. The amplitude of output pulse to the grid of the pulse tube is determined by the voltage potential on the screen of the vacuum tube 145 which, in turn, is determined by the setting of potentiometer 146. The particular values of operating potentials in a specific embodiment of the invention will be readily determined by those practicing this invention taking into consideration the characteristics of the particular vacuum tubes utilized. As in the threshold circuit, it has also been found desirable in the limiter circuit to use conventional peaking circuits in the output to provide broadband fast response operation.

As previously indicated, it is imperative in these "on-off" and "off-on" embodiments that the intensifier output be blanked out (or turned on) for a period of time encompassing the time that the image would be reproduced. This is not just the time that the high light intensity appears at the input to the apparatus of the invention, but that time (within the response capabilities of the apparatus) plus at least the delay time brought about by convolution. This may be accomplished most simply a memory adding a capacitance 126 to the switched high-voltage line 127 going to the phosphor. By adjusting this capacitance (and series resistance 128, if necessary) the building backup of the high voltage on the phosphor can be generally delayed sufficiently that the off-time essentially encompasses the transit time through the intensifier.

Figure 18:
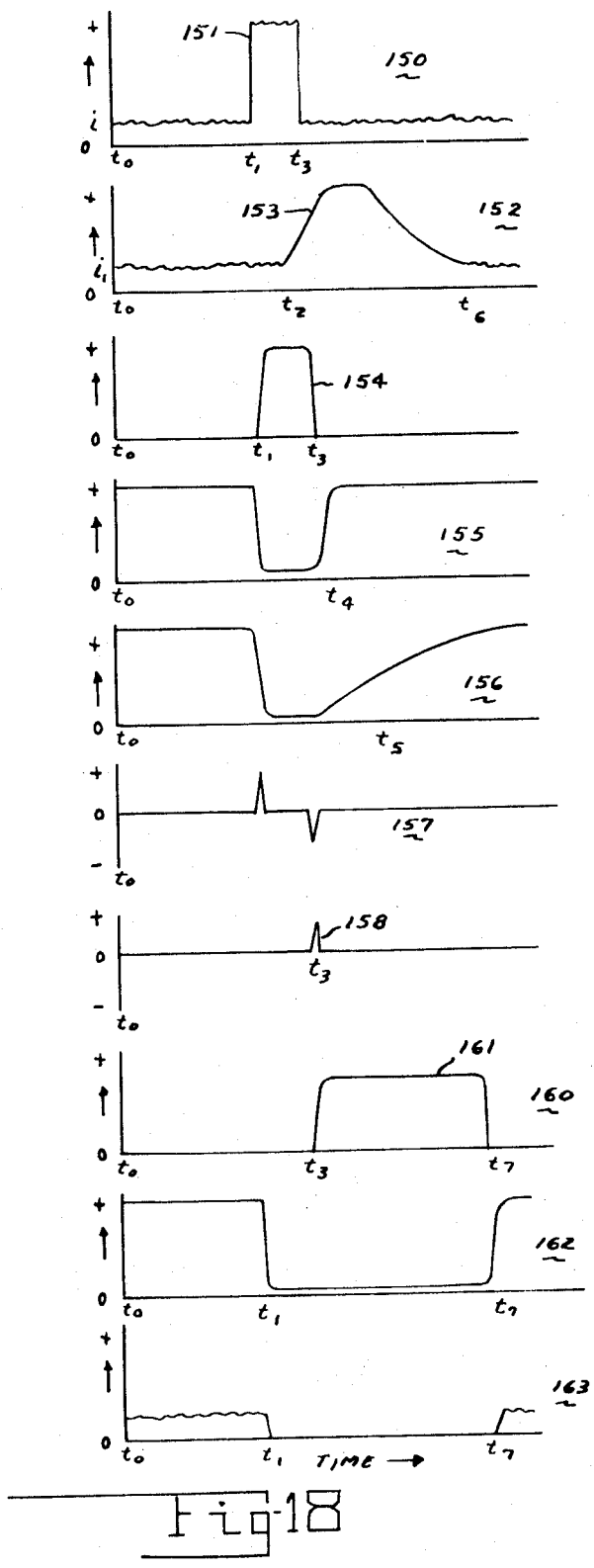
FIG. 18 shows typical waveforms occurring in the partial embodiment of the invention shown in FIG. 15.

An alternate time control system, generally preferred to the simple capacitance element, is that shown in block form 129. Obviously when capacitance 126 is used, system 129 is omitted and when the system 129 is used, the capacitance 126 is omitted. The electronic circuits used in the time control system are well-known and conventional circuits. The cooperation of the components of the apparatus shown in FIG. 15 may be best understood when FIG. 18 depicting typical wave forms throughout the system is correlated with the apparatus. In FIG. 18, the individual amplitude responses (vertical axis) correlate with a common (horizontal) time axis. Referring to both FIGS. 15 and 18, curve 150 is a representative plot of an example of the average light intensity from a scene being viewed. It is also representative of the output (amplified) from the photodetector. From time $t_o$ to time $t_1$, the average scene intensity has the value $i$. Assuming this value of scene intensity, when reproduced at the output phosphor of the image intensifier, is near the maximum safe value of intensity for the transducer being used with the invention, then any small increase in average scene intensity will activate the threshold control for blanking the output of the intensifier. At time $t_l$ a high-intensity flash 151 occurs in the field of view. Without the functioning of the control system the output from the intensifier would be as shown in curve 152 and the flash as shown at 153 would be reproduced over the time interval $t_2$ to $t_6$. Note that the peak is delayed and spread in time. This pulse 153 would overexpose and damage the transducer. With the apparatus functioning, the threshold control is triggered by the increase in signal level from the photodetector and provides an output signal to the limiter during the flash time $t_l$ to $t_3$. The limiter limits the voltage magnitude of the pulse, to a value compatible with the ratings of pulse tube 122, as previously explained, and provides a positive-going pulse 154 to the grid of tube 122 driving it positively. This places the tube in conduction and the voltage on line 127 falls toward ground. Without capacitance 126 in the circuit the wave shape of the high voltage on the phosphor 121 would appear as shown in curve 155. Note that the intensifier would be turned back on at time $t_4$; in time to reproduce a damaging burst of light to the transducer. By placing capacitance 126 in the circuit and properly proportioning its value with resistance 128, as is well known in the art, the buildup of the voltage is delayed so that the voltage curve on the phosphor is as shown in curve 156. Illumination starts to appear on the phosphor approximately at time $t_5$ and full reproduction intensity is not reached until approximately time $t_6$, the cessation of the time the flash would be reproduced. During the time the voltage is building up, after conduction in the intensifier has occurred, a distorted image of gradual decreasing distortion and gradually increasing intensity is presented to the transducer. (The actual time involved is exceedingly small.)

The generally preferred way to hold off the production of an image by the intensifier is with the system 129, rather than the capacitance 126. In this system the output from the threshold circuit is amplified and differentiated providing the pulses shown in curve 157. The phases of the pulses are inverted in inverter 168 and clamped to provide the single pulse 158 occurring essentially at time $t_3$, the cessation of the flash. This pulse 158 is used to trigger a conventional monostable multivibrator 159 having a time constant approximately equal to the total convolution time of the intensifier. Thus, the multivibrator output is a pulse as shown in curve 160, a boxcar type pulse 161 commencing essentially at time $t_3$ and extending to time $t_7$ a time slightly beyond time $t_6$. This positive pulse is applied to the grid of the pulse tube 122 and it, combined with pulse 154, holds the tube in heavy conduction from time $t_1$ to time $t_7$. This results in the potential on the phosphor 121 of the image intensifier having the characteristics shown by curve 162 and the output of the intensifier is blanked out from time $t_1$ to $t_7$ as shown by curve 163.

A similar circuit to that shown in FIG. 15 may be used signals switching the voltage on the control electrode, in intensifier stages of that type, from the potential for normal image reproduction to slightly beyond their cutoff potential. In these embodiments line 127 instead of being at the phosphor potential is at the normal control electrode operating potential, the cathode is at a potential slightly below the intensifier control electrode cutoff potential, and the grid of the pulse tube is biased at cutoff. Positive pulses from the control system then drive tube 122 into conduction which cuts off the intensifier.

Figure 19A:
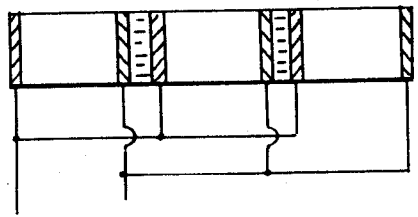
FIG. 19a shows a conventional means of supplying high voltage to a series of cascaded image intensifier tubes.
Figure 19B:
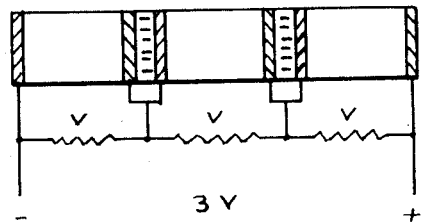
FIG. 19b shows a preferred means of providing high-voltage potentials to a series of cascaded image intensifier tubes.

Conventional image intensifier stages operate with a potential difference, V, between the photocathode and the phosphor in the range of approximately 10 kv. to 15 kv. Three stages may be cascaded and operated from a potential source of V volts as shown in FIG. 19a. In this arrangement, however, sometimes difficulty is experienced with air bubbles and other small imperfections in the fiber optics glowing under the high-potential gradient existing across the fiber optics. The arrangement shown in FIG. 19b is generally preferred in that it eliminates this difficulty. It has the somewhat disadvantage of requiring a potential source of 3 v.

Figure 21:
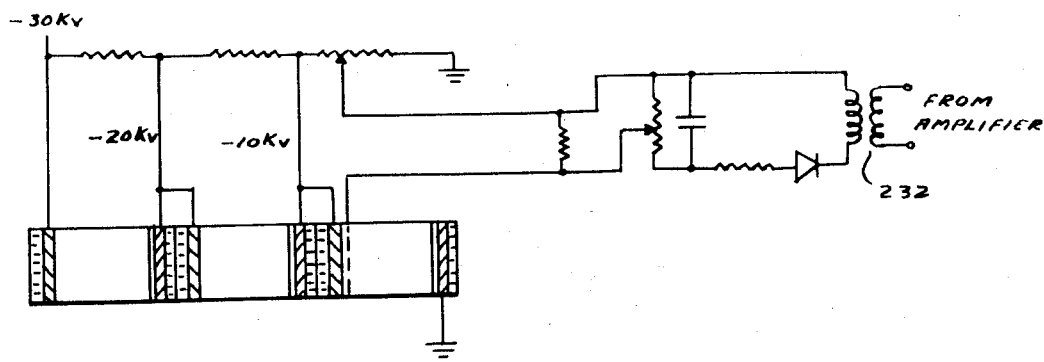
FIG. 21 is a schematic diagram of a partial embodiment of the invention showing inductive rectifier coupling and variable reference voltage control of the gate element of an image intensifier.

FIG. 20 is a more detailed drawing illustrative of structural components that may comprise the embodiment of the invention shown in block form in FIG. 10. In this embodiment at least the last stage 201 of the image intensifier has a gate control element 202 for controlling the output intensity of the stage. The embodiment shown in FIG. 20 is particularly suited to those intensifier stages, or tubes, in which the control electrode operates at essentially the photocathode potential (a negative 10 kv. in the example shown) and the output intensity is decreased and eventually cutoff with small values of an increasing negative voltage. For those types of intensifiers that require a relatively small positive potential relative to the photocathode on the control electrode for normal intensity of operation, the DC biasing arrangement shown FIG. 21 may be used.

In the apparatus shown in FIG. 20 the modulator and threshold 203 provides a signal to the amplifier 204, the amplitude of which is responsive to the magnitude that the signal from the photomultiplier and amplifier has exceeded a determined threshold value. This signal is further amplified by the amplifier 204, rectified in the voltage controller 205 and applied as a variable DC voltage to the control electrode 202 of the last intensifier stage. Thus, in operation, normal varying intensity level images are produced at the output of the intensifier until the input image intensity exceeds the determined threshold. When this occurs the voltage on the control electrode is reduced in an amount corresponding to the amount the input image intensity exceeds the normal maximum input image capabilities for the transducer being used. In this manner the input to the transducer is held at a maximum input intensity irrespective of increasing values of scene intensity up to the point of extremely high levels of scene intensity at which time control electrode of the intensifier stage will be driven sufficiently negative with respect to the photocathode to cut the stage off and no image output to the transducer will be present.

Figure 22:
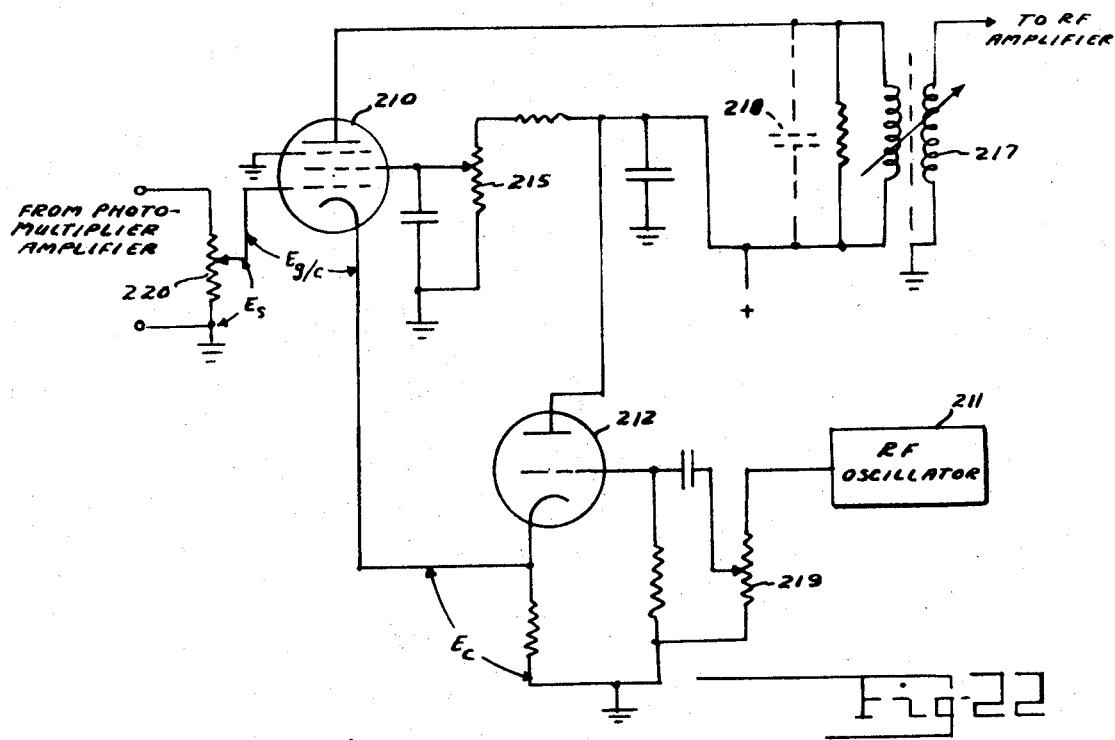
FIG. 22 is a schematic diagram showing a modulator and threshold control circuit as shown in block form in FIG. 20; States is
Figure 23:
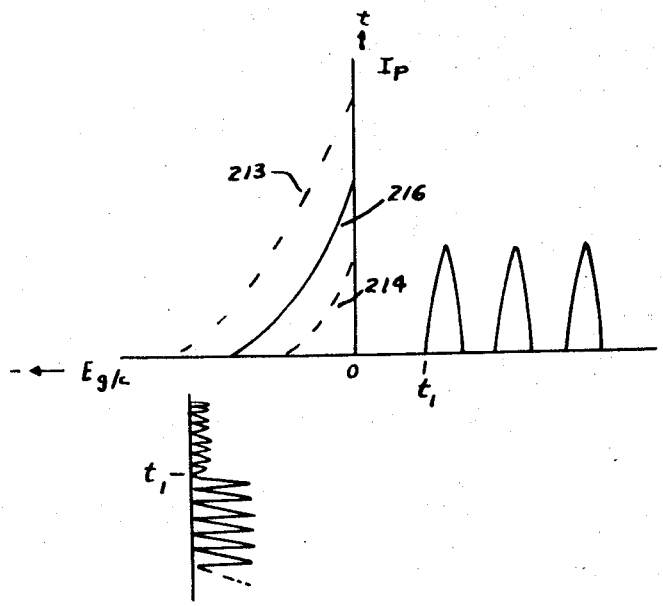
FIG. 23 shows the plate-current grid-voltage operating characteristics of the circuit shown in FIG. 22.

A typical modulator and threshold circuit that provides this control is shown in the schematic circuit of FIG. 22. The plate-current grid-voltage operating characteristics of the pentode modulator tube 210 are shown in FIG. 23. Radiofrequency oscillator 211, may be any conventional oscillator providing a signal in the 5 MHz region. (The frequency is not critical.) The output signal of oscillator 211 is coupled to the cathode of modulator tube 210 by the cathode follower tube 212. The potential on the screen grid of tube 210 determines the threshold level of the tube. Referring to FIG. 23, a lower value of screen potential results in the transfer curve 214, this raises the threshold of the system.

This is due to the fact that for a given effective negative grid potential between the grid and cathode the cutoff point has been shifted toward zero. Hence a larger positive grid signal, $E_s$, is required for forming an effective grid voltage $E_{g/c}$ which places the tube in conduction, since $E_{g/c}$ is formed by $E_s$ and $E_c$ and the latter is negative in respect to the grid of tube 210. Thus a more intense image must be received by the photodetector before the control element in the intensifier stage starts reducing the intensity of the image to the transducer. Likewise, a higher potential on the screen results in operating curve 213, lowering the threshold level. Potentiometer 215 is used to provide the optimum screen potential and operating characteristic 216 corresponding to a determined level of light intensity. While signals from the photodetector (and its associated amplifier) are below the established threshold level, none of the oscillator signal is passed by the modulator. As the grid is driven farther and farther above cutoff, (as the input image exceeds the threshold value), more and more of the oscillator signal is passed by the modulator, and the intensity gain of the intensifier stage is reduced accordingly, thereby effectively holding the image output level at a constant predetermined maximum value.

The radiofrequency output from the modulator is inductively coupled to the radiofrequency amplifier 204 (FIG. 20) by variable inductor 217 (FIG. 22). Generally, the stray capacitance in the plate circuit of tube 210 provides sufficient capacitance for tuning the variable inductor, if not, capacitance 218 may be added. Those skilled in the art will readily understand the adjustment of the oscillator signal level by potentiometer 219, the level adjustment of the positive-going signal from the photodetector and amplifier by potentiometer 220, the setting of the threshold by potentiometer 215, and the adjusting of the resultant output by the variable inductor 217, all in accord with the individual operating parameters of the individual components involved.

The radiofrequency signal responsive to the amount the input image exceeds the determined threshold from the amplifier 204 in FIG. 20 is rectified in the voltage controller 205 and converted into a varying direct current voltage for controlling the intensity of the output stage 201 of the intensifier.

In the voltage controller 205, shown in FIG. 20, capacitance coupling of the voltage controller to the amplifier is used. In the embodiment shown the control electrode 202 swings negative from the photocathode potential, which is at a negative potential of 10 kv. Thus, coupling capacitors 230 and 231 must be high-voltage capacitors. In the embodiment shown in FIG. 21 the voltage controller is inductively coupled by coupler 232 to the amplifier and the separation of the air core coils of the coupler provides suitable DC insulation.

Figure 24:
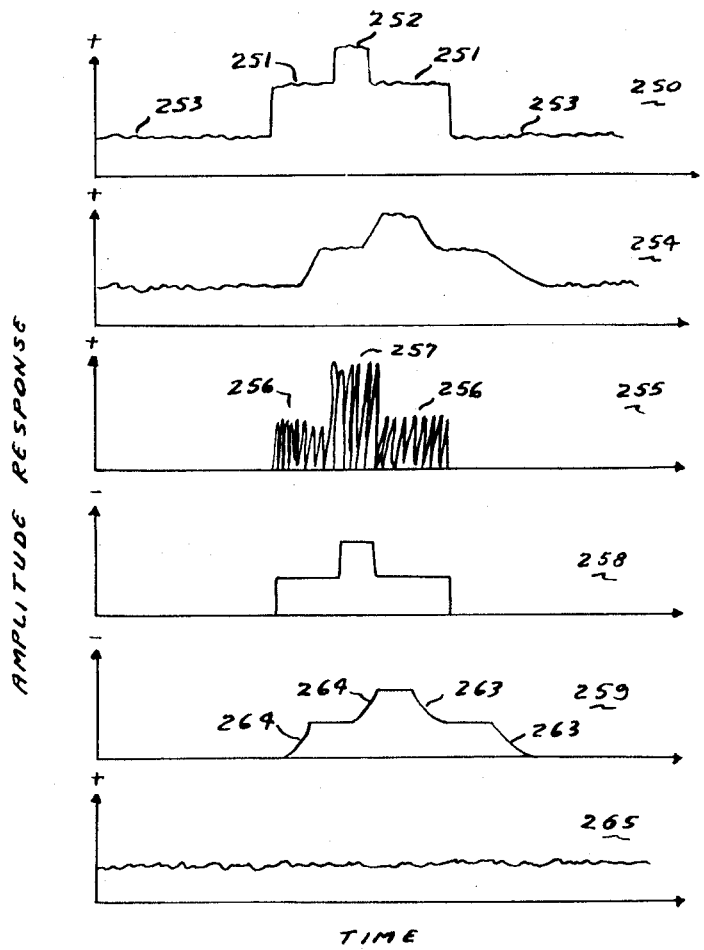
FIG. 24 shows in graphical form the major operating characteristics of the embodiment of FIG. 20.

FIG. 24 shows typical operating waveforms of these embodiments for providing a controlled value of maximum output image intensity with changes in the intensity of the scene viewed. Curve 250 represents two successive departures 251 and 252 from a normal maximum scene intensity level 253. The intensity output from the output phosphor of the intensifier would be as shown in curve 254 without the functioning of the control circuitry. The scene intensity curve 250 is also representative of the amplified output from the photodetector. The level 253 is just below the threshold level, thus no signal output from the modulator is present with level 253, as shown by curve 255 which represents the output from the modulator. Input image intensity level 251 drives the modulator into conduction and provides a radiofrequency signal having an amplitude 256. Likewise, higher intensity image input signal 252 provides the higher amplitude radiofrequency signal level 257. (The negative portion of the signal curve is not shown in the drawing.) The rectification of this signal in the voltage controller without the time constants of the added resistor-capacitance circuits would result in a negative-going (with respect to the photocathode) control voltage as shown in curve 258. Obviously this signal would not be a suitable control signal due to the convolution delay, nor would it be suitable to attempt to use a signal such as this to directly control the potentials of a camera pickup tube due to the fact that the high intensity would be on the transducer before the control circuit could respond. While reference has been made to the effect that the curve of image input intensity is also representative of the output response of the amplifier of the photodetector, this is so only because the actual slight delay occurring in the response of the photodetector and amplifier could not feasibly be shown on the curve. As is well know, slight time delays occur in the function of all the components. Thus it is only through the delay time gained by convolution that the electronic control system has time in which to function and control the output image in essential synchronism with or slightly ahead of a change in input image intensity.

The curve 259 shown in FIG. 24 results from the proper proportioning the time constants of the resistor-capacitor circuits of the voltage controller so that the change in potential applied to the control electrode in the intensifier approximately matches the rise and fall time characteristics of the convolution response. Referring to FIG. 20 the time constant brought about by the value of the total resistance of the potentiometer 260 and the capacitance 261 determines the voltage rate of fall characteristic 263, and the value of capacitance 261 and resistance 262 determine the voltage buildup characteristic 264. The very slight amount of current flow associated with the control electrode generally may be neglected. The resultant image output intensity from the output phosphor of the image intensifier is thus held essentially constant at a maximum level as shown in curve 265 with the changing input intensity shown by curve 250. Had the input intensity level been lower than that providing the desired maximum amount of intensity output, the output level would have been lowered accordingly. This could be represented by an input level below that shown at 253 in curve 250, and a correspondingly lower level in that corresponding portion (considering convolution) of the output intensity curve 265. It is to be understood that the curves of FIG. 24, as well as those others presented herein, are illustrative of a manner of operation of the apparatus and are not presented as exact operating data. Another mode of operation of this embodiment may be readily accomplished by adjusting the controls to electrically position the modulator tube in conduction for any determined image intensity level, then the received images of greater intensity will lower the intensifier control electrode potential (move toward image cutoff reducing the intensifier gain) and images of lesser intensity will raise the control electrode potential toward maximum intensifier gain. In this manner a relatively constant intensity image output from the intensifier will be obtained with changing intensity levels of image input.

FIG. 25 is a more detailed block-schematic diagram of control apparatus of an embodiment of FIG. 11. The functioning of this control apparatus is very similar to that shown in FIG. 15 except that this threshold and time control circuit provides for turning the image intensifier on to produce an image when the input intensity exceeds a predetermined threshold value. Accordingly, pulse tube 300 normally is conducting heavily and the potential of the phosphor of the last intensifier stage is essentially at ground. Thus, the intensifier provides no output and is effectively shut off. When an image received by the photodetector is of such level as to exceed the determined threshold level, the grid of pulse tube 300 is driven into cutoff and the potential on the phosphor of the last intensifier stage is raised to normal image reproduction level and the image is presented to the transducer. FIG. 26 shows typical operating waveforms. Curve 310 represents a typical input image characteristic, with the normal scene intensity level, which is not to be presented to the transducer, represented at 311. It is desired that the flash 312 be passed to the transducer. Curve 313 shows the negative-going grid pulse from the inverter 314, and curve 315 shows the negative pulse from the multivibrator. Note that the opposite polarity of pulse is taken from the multivibrator from that used in the previous embodiment. Again, this pulse length must be made to encompass at least the convolution delay time. Curve 316 represents the voltage pulse applied to the phosphor and curve 317 shows the reproduced flash 318 presented to the transducer. As previously explained, by changing the voltage potentials involved this off-on pulse circuit also may be applied to the control electrode in intensifier tubes of that type.

I claim:

1. Image control apparatus for protecting an image transducer from light of an intensity greater than a predetermined value, comprising:
    a. means for receiving light energy from a field of view and providing an image forming light beam;
    b. a first beam splitter for dividing the image forming light beam into a first beam and second beam;
    c. a photocell for sensing the light intensity of the first beam;
    d. threshold means including the said predetermined value of intensity cooperating with the said photocell for providing a signal when the intensity of the said image forming light beam exceeds the said predetermined value of intensity;
    e. a second beam splitter for dividing the said second beam into a third and fourth beam;
    f. a light shutter interposed between the said first and second beam splitters intercepting the said second beam;
    g. shutter control means responsive to the said signal from the threshold means for actuating said light shutter;
    h. a multiplier phototube for sensing the light intensity of the said third light beam;
    i. an image intensifier having a photocathode for receiving the said fourth light beam and a phosphor for providing an image output to the said protected image transducer; and
    j. output intensity control means responsive to the said multiplier phototube, cooperating with the said image intensifier for controlling the output image intensity level from the phosphor to a level below that causing damage to the said image transducer.

2. The image control apparatus as claimed in claim 1 wherein the said image intensifier comprises a plurality of cascaded image intensifier tubes.

3. Image control apparatus for providing a relatively constant image intensity to an image transducer comprising:
    a. an image intensifier having a photocathode for receiving an optical image, a phosphor for providing an image output, determined convolution light reproduction characteristics, and an intensity control electrode;
    b. means receiving light directly from the same field of view as the said image intensifier for providing a control signal responsive to the average spacial intensity of the optical image received by the image intensifier;
    c. a radiofrequency oscillator;
    d. a modulator receiving the said control signal and the output of the said radiofrequency oscillator, the said modulator having a predetermined threshold of operation corresponding to a determined value of light intensity which the said control signal must exceed in order for the modulator to provide an output signal, and the magnitude of the said output signal of the modulator then being responsive to the amount the said control signal exceeds the threshold; and
    e. a voltage controller including a rectifier and a circuit that has charge and discharge characteristics that substantially match the said convolution light reproduction characteristics of the said image intensifier, the said voltage controller receiving the said output signal of the modulator and providing a signal to the said intensity control electrode of the image intensifier whereby the image output intensity from the said image intensifier to the said image transducer is essentially uniform with varying optical image input intensities that exceed the said determined value of light intensity.

* * * * *

UNITED STATES PATENT OFFICE
CERTIFICATE OF CORRECTION

Patent No. 3,631,252      Dated December 28, 1971

Inventor(s) Radames K. H. Gebel

It is certified that error appears in the above-identified patent and that said Letters Patent are hereby corrected as shown below:

In the ABSTRACT, line 9, change "or", first appearance, to -- for --. Col. 1, line 50, change "blanking" to -- blooming --; line 66, change "kind" to -- the --. Col. 2, line 3, change "deexcitation" to -- de-excitation --; line 53, delete "States is". Col. 3, line 19, change "deexcitation" to -- de-excitation --; line 25, change "e-t" to --e $^-\alpha$t --; line 37, change "deexcited" to -- de-excited --; line 38, change "deexcited" to -- de-excited --; line 41, change "deexcited" to -- de-excited --; line 42, change "e-t" to -- e$^-\alpha$t --; line 43, delete "expressed"; line 44, delete "basic"; line 48, change "deexcitation" to -- de-excitation --; line 54, delete "invention"; line 70, after "and" insert -- more --; line 75, change "deexcitation" to -- de-excitation --. Col. 4, line 1, add quotation marks about "a" so that it reads -- factor "a" --; line 3, after "function" insert -- of --; line 5, change "deexcitation" to -- de-excitation --; line 8, change "deexcitation" to -- de-excitation --; line 28, change "OR-gates" to -- spread --; line 30, "at 50 of the intensifier 2" to -- at 50 of the intensifier 52 --; line 71, change "memory" to -- intensifiers --. Column 5, line 9, change "1801," to -- the --; line 18, after "close" insert -- to --. Col. 7, line 50, change "OR-gate" to -- image --. Col. 8, line 8, change "OR-gate" to -- would --; line 41, change "1115," to -- of --; line 60, change

UNITED STATES PATENT OFFICE
CERTIFICATE OF CORRECTION

Patent No. 3,631,252  Dated December 28, 1971

Inventor(s) Radames K. H. Gebel

It is certified that error appears in the above-identified patent and that said Letters Patent are hereby corrected as shown below:

"one-sixtieth" to --a--; line 67, change "one-sixtieth second" to --the--. Col. 9, line 16, after "in" insert --Fig.--; line 36, change "a memory" to --by--; line 64, change "$t_\ell$" to --$t_1$--; line 72, change "$t_\ell$" to --$t_1$--. Col. 10, line 40, change "signals" to --in--; line 60, change "3v" to --3V--. Col. 11, line 18, after "time" insert --the--. Col. 14, line 2, after "third" insert --beam--.

(Page 2 of 2)

Signed and sealed this 14th day of January 1975.

(SEAL)
Attest:

McCOY M. GIBSON JR.
Attesting Officer

C. MARSHALL DANN
Commissioner of Patents